US010929785B2

(12) United States Patent
Bernstein et al.

(10) Patent No.: US 10,929,785 B2
(45) Date of Patent: Feb. 23, 2021

(54) SYSTEM AND METHOD FOR MULTI-LEVEL DATA REPRESENTATION OF OBJECT LIFECYCLE

(71) Applicants: Purdue University, West Lafayette, IN (US); TATA Consultancy Services Limited, Mumbai (IN)

(72) Inventors: William Z. Bernstein, West Lafayette, IN (US); Devarajan Ramanujan, West Lafayette, IN (US); Karthik Ramani, West Lafayette, IN (US); Devadatta Madhukar Kulkarni, Rochester Hills, MI (US); Jeffery Tew, Rochester, MI (US)

(73) Assignees: Purdue University, West Lafayette, IN (US); TATA Consultancy Services Limited, Mumbai (IN)

( * ) Notice: Subject to any disclaimer, the term of this patent is extended or adjusted under 35 U.S.C. 154(b) by 1027 days.

(21) Appl. No.: 14/818,816

(22) Filed: Aug. 5, 2015

(65) Prior Publication Data

US 2016/0042104 A1 Feb. 11, 2016

Related U.S. Application Data

(60) Provisional application No. 62/034,030, filed on Aug. 6, 2014.

(51) Int. Cl.
*G06Q 10/06* (2012.01)
(52) U.S. Cl.
CPC ................... *G06Q 10/06* (2013.01)

(58) Field of Classification Search
CPC ...................................................... G06Q 10/06
See application file for complete search history.

(56) References Cited

U.S. PATENT DOCUMENTS

| 5,878,433 A * | 3/1999 | Miyamoto | G06F 17/5009 |
| 6,490,569 B1 * | 12/2002 | Grune | G06Q 10/00 705/28 |
| 6,748,287 B1 * | 6/2004 | Hagen | G06Q 10/06 700/100 |
| 2005/0229113 A1 * | 10/2005 | Martineau | H04L 41/22 715/822 |
| 2006/0155554 A1 * | 7/2006 | Mo | G06Q 10/06 345/619 |
| 2008/0065436 A1 * | 3/2008 | Wu | G06Q 10/06 705/7.38 |

(Continued)

*Primary Examiner* — Omar F Fernandez Rivas
*Assistant Examiner* — Bernard E Cothran
(74) *Attorney, Agent, or Firm* — Schwegman Lundberg & Woessner, P.A.

(57) ABSTRACT

System and method for multi-level visualization of object lifecycle is provided. A visualization network displaying data associated with the object life cycle is provided. An object is selected from the visualization network to correlate the object across and within one or more object lifecycle stages from the visualization network by generating a relationship configuration. A multi-level visualization is generated for the selected object corresponding one or more object life cycle stage. The generated at least one multi-level visualization is modified based on a criterion of interest, the criterion of interest comprises one or more attribute associated with the selected object and relation derived from the relationship configuration.

16 Claims, 5 Drawing Sheets

(56) References Cited

U.S. PATENT DOCUMENTS

2012/0197944 A1* 8/2012 Foti .................... G06F 12/0253
707/798
2014/0058797 A1* 2/2014 Roy ....................... G06Q 50/04
705/7.36

* cited by examiner

| | Update object border size (501, 502) | Update object background color (501, 502) | Update all objects & layouts (501, 502) | Update label object (501,502) | Update detail viewer (503) | Update all points and layout (505) |
|---|---|---|---|---|---|---|
| Change selected object (501, 502) | | | X | X | X | X |
| Change criterion of interest (504) | X | | X | | | X |
| Change coloring scheme (504) | | X | X | | | X |
| Emphasize value chain (501) | X | X | X | | X | X |

SYSTEM AND METHOD FOR MULTI-LEVEL DATA REPRESENTATION OF OBJECT LIFECYCLE

CROSS-REFERENCE TO RELATED APPLICATIONS AND PRIORITY

This application is related and claims the benefit of priority to U.S. Provisional Patent Application Ser. No. 62/034,030, filed on Aug. 6, 2014, the entirety of which is incorporated herein by reference.

TECHNICAL FIELD

The present subject matter relates, in general, to data representation, and, in particular, to systems and methods for multi-level data representation of object lifecycle.

BACKGROUND

Integrating an object configuration, for example a product architecture with value chain design, for example, a supply chain design is a complex problem. There has been considerable work in modeling products and their supply chains to further understand a design system for these products. For example, modeling supply chains as visualization networks has led to the development of various criticality and complexity metrics to better understand supply chain network configuration. In scenarios where large complex and heterogeneous datasets exist, such as product systems, visual analytics have proven to alleviate a user's cognitive load and expedite useful exploration by projecting emergent relationships between entities. However, the application of these guiding visualization principles to engineering systems remains in a nascent stage.

In the context of product and supply chain redesign related decision scenarios, understanding the effects of changing a particular component with respect to the rest of its product system, including supply chain entities is difficult, as there exist both indirect and direct relationships with other network entities. Even after conducting a full-fledged life cycle assessment (LCA), it is still difficult to identify feasible redesign opportunities, including balancing cost and operational performance with environmental performance. Current LCA platforms and methodologies can inform redesign practices, but the lack of intuitive data representation create decision-related barriers, for example, redesign related decision scenarios for a product or a supply chain.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, embodiments herein provide a systems and methods for providing multi-level data representation of object lifecycle. In one aspect, a computer-implemented system for multi-level data representation of object life cycle is provided. The system includes a visualization interface, at least one memory and at least one processor. The visualization interface and at least one memory coupled to the at least one processor is capable of executing programmed instructions stored in the at least one memory to select at least one object from at least one visualization network, on at least one device, the at least one visualization network represents a network of one or more object life cycle stages, the at the least one visualization network comprising an object configuration network and an object value chain network; correlate the at least one object across and within one or more object lifecycle stages by generating a relationship configuration, the relationship configuration comprises a relation between the at least one object with one or more object lifecycle stages; compute a criticality metric for the at least one object, the criticality metric being a measure of a connection of the at least one object with one or more object lifecycle stages derived from the relationship configuration; and generate at least one multi-level visualization for the at least one object corresponding to one or more object lifecycle stages based on the criticality matric.

In another aspect, computer-implemented method executed by a computing device for multi-level data representation of object lifecycle is provided. The method includes selecting at least one object from at least one visualization network, on at least one device, the at least one visualization network represents a network of one or more object life cycle stages, the at least one visualization network comprising an object configuration network and an object value chain network; correlating the at least one object across and within one or more object lifecycle stages by generating a relationship configuration, the relationship configuration comprises a relation between the at least one object with one or more object lifecycle stages. Further, computing a criticality metric for the at least one object, the criticality metric being a measure of a connection of the at least one object with one or more object lifecycle stages derived from the relationship configuration and generating at least one multi-level visualization for the at least one object corresponding to one or more object lifecycle stages based on the criticality matric.

In yet another aspect, a non-transitory computer-readable medium having embodied thereon a computer program for executing a method for multi-level data representation of object lifecycle is disclosed. The method includes selecting at least one object from at least one visualization network, on at least one device, the at least one visualization network represents a network of one or more object life cycle stages, the at least one visualization network comprising an object configuration network and an object value chain network; correlating the at least one object across and within one or more object lifecycle stages by generating a relationship configuration, the relationship configuration comprises a relation between the at least one object with one or more object lifecycle stages. Further, computing a criticality metric for the at least one object, the criticality metric being a measure of a connection of the at least one object with one or more object lifecycle stages derived from the relationship configuration and generating at least one multi-level visualization for the at least one object corresponding to one or more object lifecycle stages based on the criticality matric.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

Figure 1:
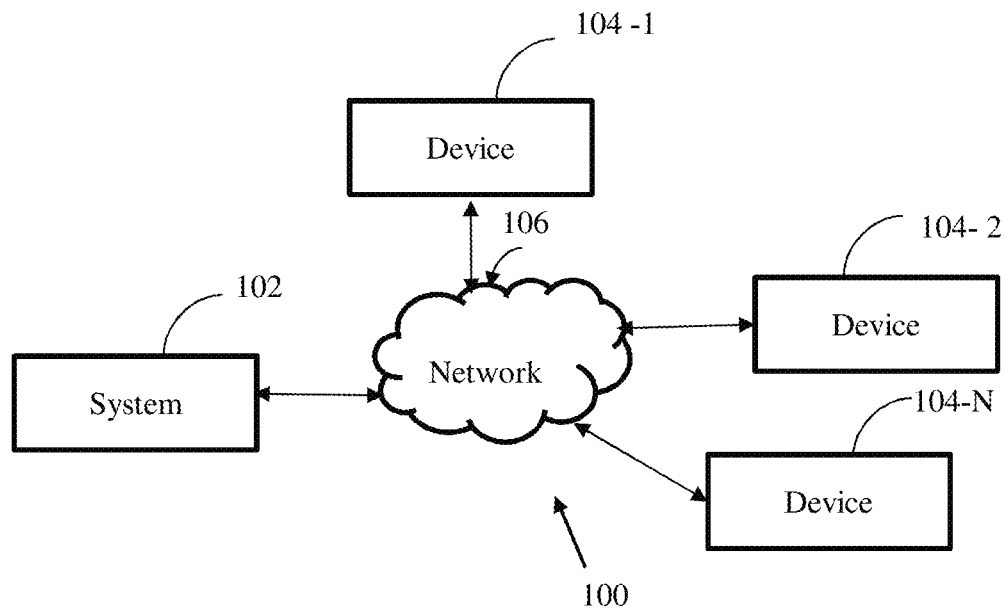
FIG. 1 illustrates a diagram of an example environment in which systems and/or methods, described herein, may be implemented, in accordance with example embodiments.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary diagram of an environment 100 implementing a multi-visual representation system 102 of object life cycle, in accordance with example embodiments. The multi-visual representation system 102 may hereinafter be referred to as a system 102. The system 102 may be implemented in a variety of computing systems such as a laptop computer, a desktop computer, a notebook, a workstation, a mainframe computer, a server, a network server, and the like. It will be understood that the system 102 may be accessed through plurality of devices, for example electronic devices 104-1, 104-2, and 104-N, that may be collectively referred to as electronic devices 104. Examples of the electronic devices 104 may include, but are not limited to, a portable computer, a personal digital assistant, a handheld device, and a workstation. The electronic devices 104 are communicatively coupled to the system 102 through a network 106 for facilitating one or more users to access the system 102. In an embodiment, the electronic device 104-1 belongs to a user, and may facilitate a user in accessing information from the system 102. Likewise, the electronic devices 1041-N may belong to a plurality of users.

The system 102, for example is a system architecture with server-side management to store and maintain user interactions on the electronic devices 104, and exploration activities from a plurality of users connected via a network 106. The electronic devices 104 are configured to capture information such as user interaction with the system 102, with other users and results of these interactions is used to update the multi-level visualization data representation of the object. Further, the system 102, is described in detail with respect to FIG. 2.

In one implementation, the network 106 may be a wireless network, a wired network or a combination thereof. The network 106 can be implemented as one of the different types of networks, such as intranet, local area network (LAN), wide area network (WAN), the internet, and the like, or any combination thereof used for transferring information between the electronic devices 104 and system 102. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
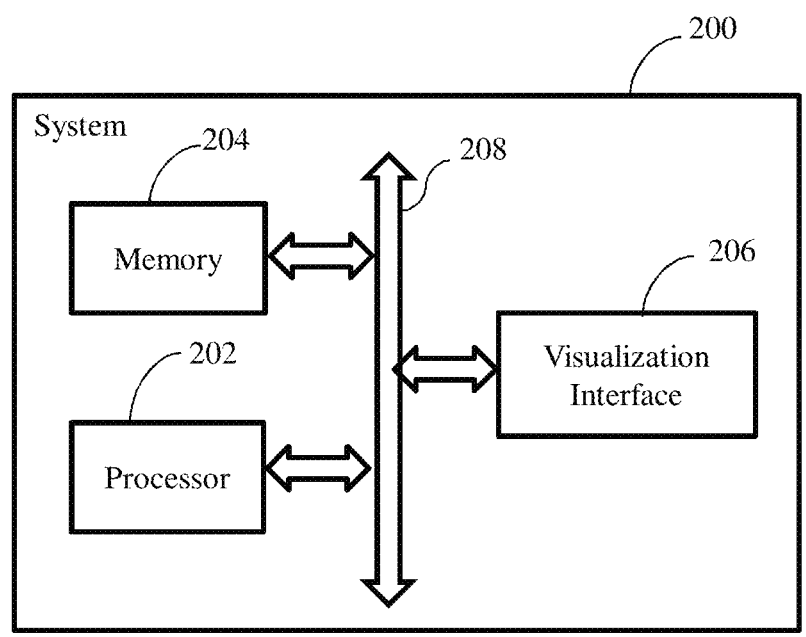
FIG. 2 is a block diagram of the system of FIG. 1, in accordance with an example embodiment.

FIG. 2 is a block diagram of a system 200 for multi-level data representation of object lifecycle, in accordance with an example embodiment. The system 200 is an example of the system 102 of FIG. 1. The system 200 includes or is otherwise in communication with at least one processor such as a processor 202, at least one memory such as a memory 204, and a visualization interface 206. The processor 202, the memory 204, and the visualization interface 206 may be coupled by a system bus such as a system bus 208 or a similar mechanism. Although FIG. 2 shows example components of system 200, in other implementations, system 200 may contain fewer components, additional components, different components, or differently arranged components than depicted in FIG. 2.

The at least one processor such as the processor 202 may be implemented as one or more microprocessors, microcomputers, microcontrollers, digital signal processors, central processing units, state machines, logic circuitries, and/or any devices that facilitates in managing access to a financial account. Further, the processor 202 may comprise a multi-core architecture. Among other capabilities, the processor 202 is configured to fetch and execute computer-readable instructions or modules stored in the memory 204. The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The memory 204, may store any number of pieces of information, and data, used by the system 102 to implement the functions of the system 102. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system 200 to behave in a manner as described in various embodiments.

The visualization interface 206 may include an input interface and an output interface. The output interface may include an output device such as a display, a ringer, an earphone or speaker, a microphone, and an input interface. The visualization interface 210 may be in communication with the processor 202. In this regard, for example, the processor 202 may comprise user interface circuitry configured to control at least some functions of one or more elements of the visualization interface 210. The processor 202 and/or user interface circuitry comprising the processor 202 may be configured to control one or more functions of one or more elements of the visualization interface 210 through computer program instructions, for example, software and/or firmware, stored on a memory, for example, the memory 204, and/or the like, accessible to the processor 202.

In an example embodiment, the processor 202 along with the memory 204 and other components of the system 200 may be configured to select an object on the electronic devices 104. For example, the processor 202 may retrieve the object selection from the memory of the system 102. One or more functionalities of the system 200 and components thereof, is further explained in detail with respect to FIG. 3

In an example embodiment, the visualization interface 210 is configured to display multidimensional data of the object. Further, visualization interface 210 is further configured to display a visualization network. The visualization network includes an object configuration network and an object value chain network. For, example, an object may be a component, or a sub-assembly of components, or an assembly of components, product. In an example embodiment, the visualization network may be represented in the form of nodes and edges. In the object configuration network, the node represent the object, for example a component, sub-component, assembly, sub-assemblies and the edges represent the structural relationships between the objects. The edges are depicted by the pathways in the visualization network. For example, a node associated with a component may be connected through one or more edges to other sub-components. The sub-components together forms the component. In another example, the node may be connected to other nodes representing other objects in the visualization network. Similarly, the object value chain network includes nodes and edges. The nodes represent the stages of a value chain of the object and edges define the flow of the object within the value chain. Herein, the object will be referred as node and relationship between the nodes will be referred as edges, to describe the functional flow of the system 200, for the sake of brevity of description and clarity of explanation of the embodiments. Further, it may be noted that any computed value such as the relationship configuration, change propagation metric, modularity index described herein, will be derived from the relationship of the nodes and edges from visualization networks described above.

The visualization interface 210 allows a user to select an object from the network of object configuration and from the network of value chain. Furthermore, the visualization interface 206 facilitates a coordinated (view) visualization of the network and the resultant multi-visual representation with respect to a plurality of devices. The plurality of devices, for example, may be the electronic devices 104 as described with respect to FIG. 1. The visualization network and the resultant multi-visual data representation of the object life cycle is displayed as graphical data. The graphical data are mapped onto the one or more visual variables.

In an example embodiment, the one or more visual variables may include Jacques Bertin's seven basic visual variables, namely position, size, shape, value, color, orientation, and texture. A value associated with each visual variable determines the presentation of the graphical data. Further, appropriate visual variable is mapped on to the graphical data by using Jacques Bertin's visual variable characteristics: selective, associative, quantitative, order, and length. The graphical data is classified based on visual variable characteristics and are similar graphical data grouped to obtain clusters of similar graphical data for multi-level representation of the object. In this example embodiment, the graphical data includes nodes, each node is associated with the visual variables like size, color and position. The size of the node represents a criteria of interest. The sizing of the node is directly proportional to the criteria of interest. The color of the node represents the value chain stages, for example, a supply chain stages like manufacturing stage, assembly stage, retail stages and the like. The position of the node represents the parent-child relationship of the objects (assembly-sub-assemblies).

In an example embodiment, the system 200 may include a data repository (not shown in the figure) including data associated with the object. Herein, the object may be a component, or a sub-assembly of components, or an assembly of components. The data associated with the object lifecycle is represented in the form of visualization network. The entire life cycle of object configuration and object value chain is represented in the form of the visualization network. Further, the details of the data associated with the object is explained with reference to FIG. 3.

Figure 3:
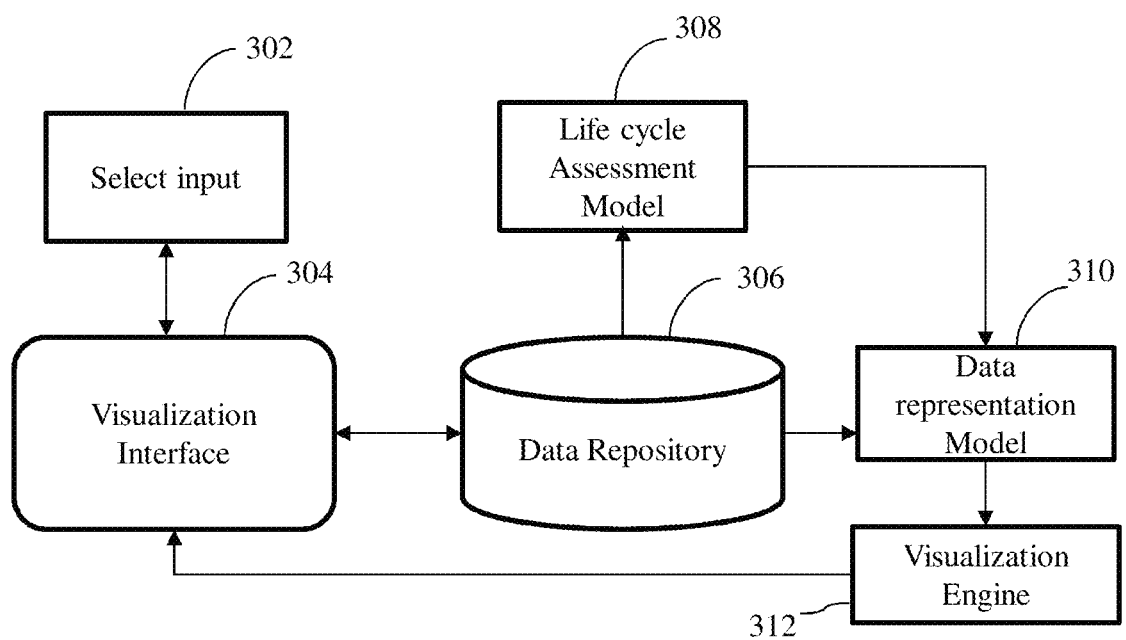
FIG. 3 illustrates a system architecture 300 for multi-level data visualization, in accordance with an example embodiment.

FIG. 3 illustrate a system architecture 300 for multi-level data visualization, in accordance with an example embodiment. The system architecture 300 pertains to the system 200 (FIG. 2). The system architecture 300 is shown to include a select input 302 in communication with a visualization interface 304 displaying the select input 302. The visualization interface 304 is in communication with a data repository 306, the data repository includes data associated with the object. The data repository 306 is in communication with a life cycle assessment model 308 and data representation model 310. The life cycle assessment model 308 and data representation model 310 includes data associated with the object and may be configured to receive one or more data from the data repository 306. The life cycle assessment model 308 may further include life cycle inventory (LCI) inputs for environmental assessment for a selected object. The data representation model 310 may further include computed metrics/values associated with the object, such as environmental indicators from LCA, data attributes, relationship values, CPM. The computed matric/value from the data representation model 310 is received by a visualization engine 312. The visualization engine 312 captures and organizes the computed values. The visualization engine 312, captures the computed values and organizes in to graphical data. The graphical data is further assigned into one or more visual variables as described above and then into a visualization layouts. The visualization layouts are received and displayed by the visualization interface 304.

As shown in FIG. 3, an object is selected from the at least one visualization network at object selection input 302. The selection of the object (input) may be performed on at least one device, from amongst a plurality of devices, for example, electronic devices 104 (as shown in FIG. 1). In one implementation, the selection of the object may be from the object configuration network. For example, a product configuration network, including an assembly, sub-assembly etc. The selection of the object in the object configuration network will select (highlight) the corresponding objects (related) in the object value chain network, for example, supply value chain network, including manufacturing stage, assembly stage, retail stage etc. In another implementation, the selection of the object may be from object value chain network and the corresponding object from the object configuration network is selected. The selection of the object with respect to the two visualization network is described in detail with respect to FIGS. 4A and 4B.

The data repository 306, in communication with the visualization interface 304, includes data related to the object value chain, for example, a supply value chain, such as object material, manufacturing process, and supply chain stage dependency within and across a stage. Further, the data repository 306 includes data related to object configuration like for example, an assembly configuration, information associated with the assembly such as structural dependency with other assembly (assembly, sub-assembly). The data repository 306 receives the user input via visualization interface 304, herein the object selection is the input. In an example embodiment, a supply chain network, a product database management (PDM) (not shown in the figure) including the data associated with the product. The data repository 306 may receive the product information via PDM. The PDM also generates Life Cycle Inventory (LCI) for each of the product in the PDM. The LCI is extracted from the PDM by the data repository 306 and transferred to life cycle assessment model 308. In this example embodiment, the life cycle assessment impacts are created in the life cycle assessment model 308 based on the structure of a supply chain and the product configuration and LCI inputs. In an example embodiment, the LCA data may be considered for eco-conscious redesign for the object lifecycle.

As shown in FIG. 3, the data representation model 310, in communication with the data repository 306 and the visualization interface 304 includes the data received from the data repository 304 and the computed matric from the system 200. The visualization networks are represented in the form of nodes and edges. Within the data representation model 310, data related to the computed metrics includes but not limited to a modularity index defining the strength or density of the visualization network (degree of connection of nodes within a network), a change propagation metric (CPM) representing connectivity of the nodes in the object configuration and object value chain visualization network, and LCI data for assessing the environmental impact for the data associated with the object. The data associated with object such as object attributes are overlaid onto graphical representations of the object life cycle. The graphical representations is mapped on to one or more visual variables as described above. In an example embodiment, the data representation model 310 also receives the life cycle assessment impacts from the life cycle assessment model 308.

As shown in FIG. 3, the computed matric is captured and organized in a unit, for example, a visualization engine/software 312, in communication with the visualization interface 304. The selected node (object) is correlated across and within one or more object lifecycle stages. In an example embodiment, the node is selected from the object configuration network, and the node is correlated with nodes across the object life cycle from the value chain network and nodes within the object configuration network. Further, a correlation between the nodes is established by generating a relationship configuration (for example a relationship graph) based on the edges (paths connected to the node). The calculation of the relationship configuration is explained in the following embodiment. The relationship graph considers the modularity index, for each of the visualization network, while generating the relationship between the nodes.

In an example embodiment, the object value chain and object configuration network are represented as graphs and a graph-theoretic technique is adapted to assess the relative connectivity of a node with respect to the overall graphical representation. The graph includes the nodes and edges of the object life cycle containing the object configuration network and object value chain network. The relation of objects are captured via an adjacency matrix (ad j). The adjacency matrix is the measure of the relationship configuration of the selected node with respect to the object life cycle stages (other nodes in the network). In this example embodiment, given an adjacency matrix of the graph, G, the total number of paths of length up to k is computed by the following equation 1 (Eq. 1)

$$\text{ad } j(G^k) = \Sigma_{i=1}^{k} [\text{ad } j(G)]^i \qquad (\text{Eq. 1})$$

The metric presented in Eq. 1 represents neighborhood closeness of the nodes with respect to other nodes in the network. The measure of the connection between the nodes in the network is defined with respect to a criticality metric. The criticality metric generates a value based on at least one object attribute and the relationship configuration. A plurality of criticality matric are created based on one or more object attributes to determine the connection between the nodes.

Referring to FIG. 3, a Change Propagation Metric (CPM) is computed and stored at Data Representation Model 310 for further comparison of the node across the life cycle stage. The CPM provides a node centrality measurement in each of the visualization network that is the object value chain and object configuration network. The CPM is computed based on each network (represented as graph). In an example embodiment, the CPM is based on aforementioned Eq. 1, where k=2. As shown in Algorithm 1, the CPM is computed by summing each row of an adjacency matrix 'A' that defines the network structure, except for the corresponding diagonal value of A. The diagonal elements of 'A' are omitted for the calculation because the CPM represent the total number of connections between the $i^{th}$ value chain element and the other j elements, excluding the relationship of $i^{th}$ value chain itself. The algorithm inputs an adjacency matrix of a graph, G, and outputs a column vector containing all CPM values.

Algorithm 1:

Data: G

Result: CPM $A \leftarrow \sum_{m=1}^{2} [adj(G)]m$ for all the $i \in A$ do

|forall the $j \in A, j \neq i$ do

|| $CPM_i \leftarrow \sum_{j} [A_{ij}]$

|end end return CPM

In an example embodiment, the centrality measurement provides closeness centralities of the pathways (edges) in the graph and calculates the shortest paths between the nodes. For example, a component, node, from the object configuration is connected to sub-component via pathways and to one or more value chain stages from the value chain network. The closeness is calculated for a given component attribute.

The visualization engine 312 captures and organizes the computed matric as visualization layouts to generate at least one multi-level visualization. The at least one multi-level visualization is displayed on at least one device, from amongst, electronic devices 104 via an output interface, for example, the visualization interface 304. The computed values are in the form of a graphical representation. The graphical representation includes and not limited to a single bar graph, a network visualization, multiple bar graph, spark lines, boxplot and the like.

The generated at least one multi-level visualization includes at least two object life cycle stages, the object life cycle stages from the object value chain network and object configuration network. The at least two object life cycle stages are linked to provide a mutually coordinated visualization.

The system architecture 300 facilitates in allowing a user to modify the at least one multi-level visualization for the at least one object based on a criterion of interest. The criterion of interest is a set of parameters comprising one or more object attributes. The change and effect of the at least one multi-level visualization, with respect to criterion of interest is explained in detail with respect to FIGS. 4A and 4B. The impact of the correlated data is evaluated by comparing the object with one or more life cycle stages for each of criterion of interest. The impact of correlation is a score associated with criticality metric of the at least one object.

Figure 4A:
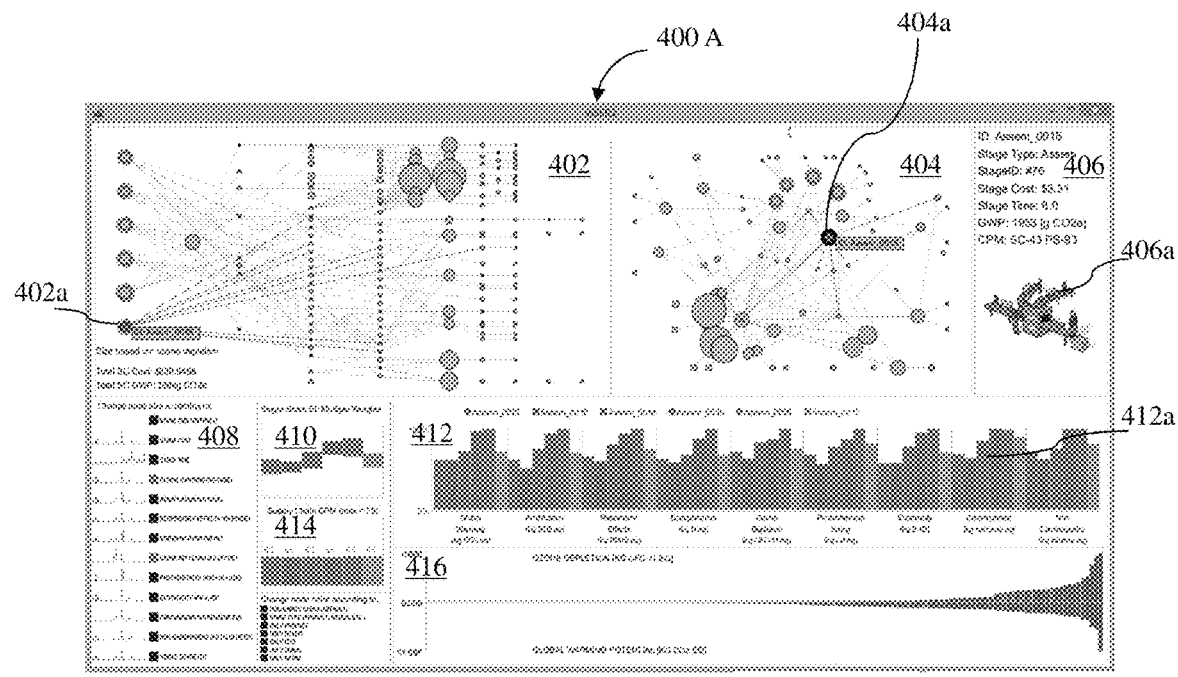
FIG. 4A is graphical representation illustrating coordination across various layouts for a criteria of interest, in accordance with an example embodiment.
Figure 4B:
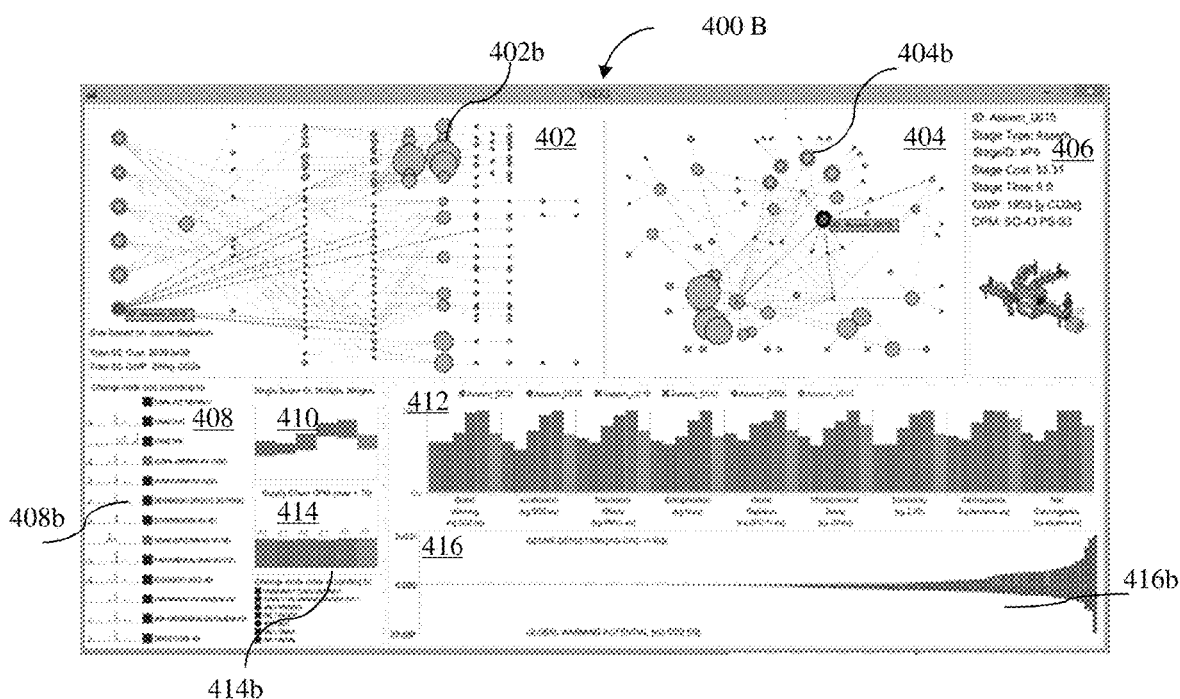
FIG. 4B is a graphical representation illustrating coordination across various layouts for a change in the criteria of interest, in accordance with an example embodiment.

FIGS. 4A and 4B are graphic representations 400A and 400B illustrating coordination across various layouts for a criteria of interest and change in the criteria of interest, respectively, according to an embodiment of the present disclosure. In FIG. 4A, the representation 400A shows various layouts (402, 404, 406, 408, 410, 412, 414 and 416) for representing the multi visual data of the selected object.

The object (node) is selected from the object configuration network in layout 402 (as shown at 402a). The selection of the object at 402 updates the value chain network at 404 (as shown at 404a). Further, the details of the selected object are updated at 406 (as shown at 406a). The details of the object may include and not limited to life cycle stage details, for example, stage type, stage time, object ID, object ID number and the like.

When a user selects the node, an ID label associated with the node (as shown at 402a and 404a) is shown on both the network visualization to provide an understanding of the role of the node in both contexts (both object configuration and object value chain). Additionally, the edges connecting the selected node with other nodes (multiple node connection may be established for a node selection) are highlighted with respect to the non-connected edges (as shown in 400A, edges emerging from the 402a and 404a are highlighted in comparison with the other nodes) to provide a representative view of the connectivity of the nodes. For example, a component (i.e., node) shared across multiple sub-assemblies (parent-child relation) in the object configuration network may be associated with several edges (distribution pathways) within the object configuration network and across the related nodes in object value chain network.

In an example embodiment, one or more criteria of interest, represented as spark lines in the graphs at layout 408 is selected and set on a predetermined value. In an embodiment, the predetermined value may be user define, and based on requirement of the user. The criteria of interest is a set of parameters associated for each object. Examples of parameters may include and not limited to time associated with a given object, environmental impact of an object, cost of an object. For the selected node, a weighting schemes (weighted single scores) are computed as represented by single bar graph at layout 410. A vector space model is adapted to compute the single scores to assign a relevancy ranking (scores) for each of node connections. The ranking of a node connection is the extent to which a node connection scores over the other node connections. The node connection is within the network (herein, the object configuration network) and the node connections across the life cycle (herein, the object value chain network). The relationship graph is determined based on scores for the selected node.

The selected node is compared with respect to multiple criteria of interest, to evaluate the impact of the scores for each node connections as shown in layout 412. The comparison of the selected node with respect to the other connected nodes with respect to one or more criteria of interest provides a performance matric of the selected node across the entire value chain of the object (the entire object lifecycle associated with the selected node). CPM is calculated based on the relationship graph obtained and is displayed at layout 414. The pre-defined set of criteria of interest for the selected node is compared with the entire value chain). In response a profile of the selected node with respect to one or more criteria of interest is displayed at layout 416. The comparison chart at layout 412 and the profile at layout 416, provides a potential redesign opportunity for the selected node (object).

Referring to FIG. 4B, for a change in criteria of interest 408 (as shown at 408b), the border of the selected node (node size) is updated (as shown at 402b and 404b). Similarly for a change in color scheme (change in CPM), the background color (relationship of node) of the node (as shown in 402b and 404b) is updated. Accordingly, the profile of the selected node with respect to one or more criteria of interest is displayed at layout 416. The change and effect of these layouts are described in detail in FIGS. 5A and 5B.

Figures 5A, 5B:
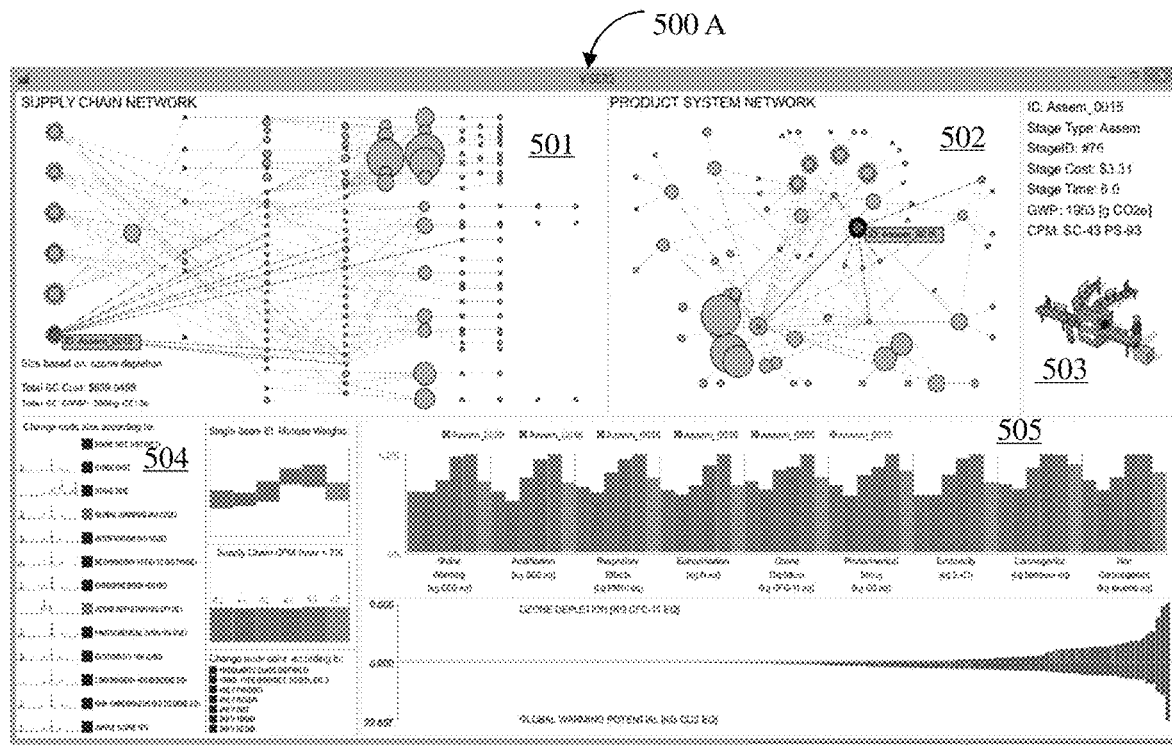
FIG. 5A is graphical representation illustrating interaction across various layout, in accordance with an example embodiment.
FIG. 5B is a table illustrating interaction across various layout, in accordance with an example embodiment.

FIGS. 5A and 5B are graphical representation 500A and table 500B illustrating coordination across various layout for a criteria of interest and a change in criteria of interest, respectively, in accordance with an example embodiment. As shown in FIG. 5A, any changes/modification with respect to the object selected, is depicted in the layouts 501, 502, 503, 504 and 505. The changes/modification may include but not limited to change in selected object in layout 501, or change in selected object attribute 502, changes in criterion of interest in layout 504, change in coloring scheme in 504, change in emphasize value chain (related value chain corresponding to the selected object) is represented in layout 501. Referring now to FIG. 5B, the corresponding effects (of the changes discussed with reference to FIG. 5A) is shown in table 500B (across the first row of the table). Herein, the corresponding effects are referred with respect to the changes/modification (across the first column of the table). Referring collectively to graphical representation 500A and table 500B, in an example embodiment, the change in object selection 501 may have effect on the object background color, object label and object layout, detailed viewer, points and layout (marked 'x' in the table). Similarly, the change in criterion of interest 504 may have effect (by updating) on the object background color, object label and object layout, object label and all points, and so on and so forth. Various embodiments are as shown in the FIG. 5B, particularly table 500B, depicting various combinations of the change and effect with respect to the object for which the query is defined, reference object and the computed similarity values.

Figure 6:
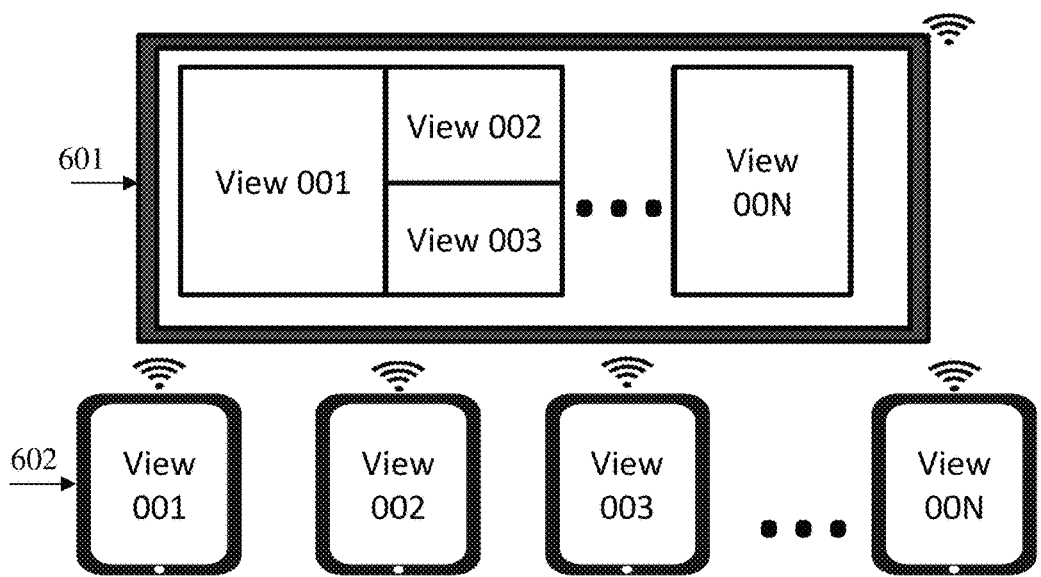
FIG. 6 illustrates collaboration across the plurality of devices, in accordance with an example embodiment.

FIG. 6 illustrates collaboration across the plurality of devices as shown at 602, in accordance with an example embodiment. In addition to the display as described with reference FIG. 2, in an example embodiment, the visualization (view) may be on a single display (as shown at 601) including all the individual displays or individual display on each device (as shown at 602). A user may interact with another user from amongst the plurality of users for each of the visualization representation.

Figure 7:
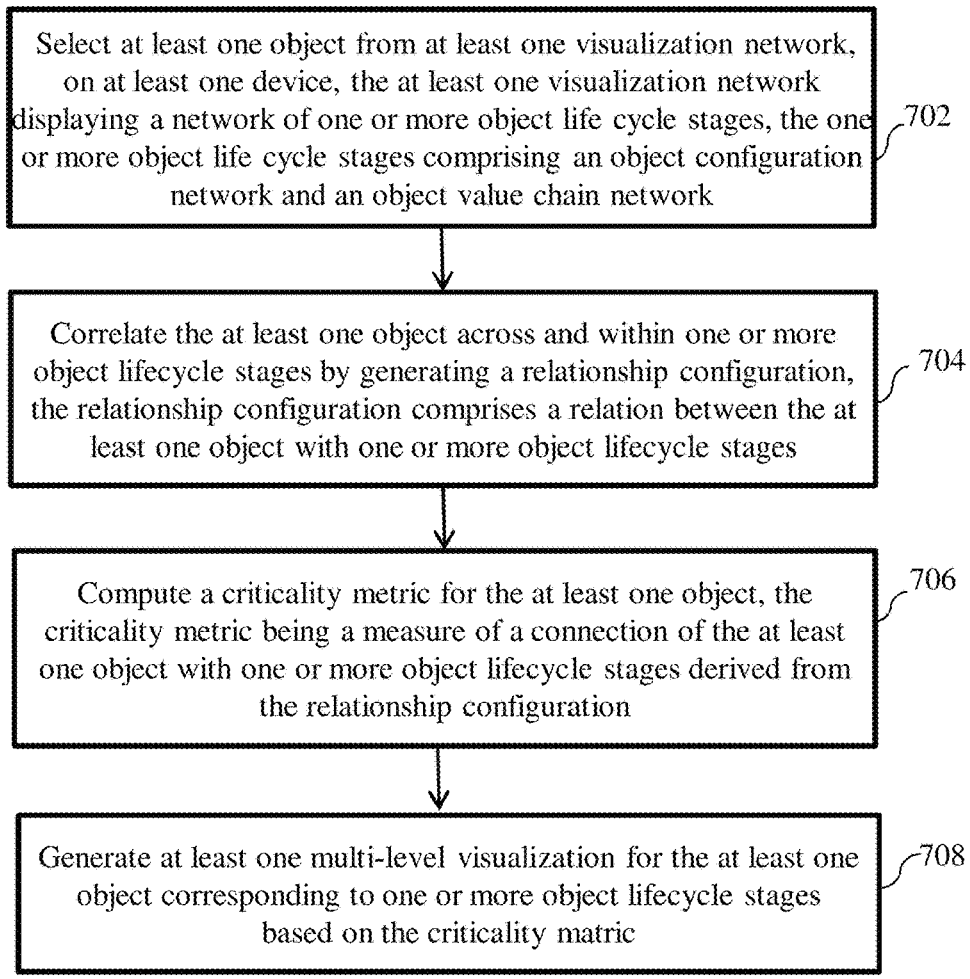
FIG. 7 illustrates a flow chart for multi-level data representation of object lifecycle, in accordance with an example embodiment.

FIG. 7 illustrates a flow diagram of a method 700 for multi-visual data representation of object lifecycle, in accordance with the present disclosure. At block 702, the step of selection of at least one object is performed. The visualization network presents the object life cycle and includes object configuration and value chain network. The life cycle stage represents as network comprises of nodes and edges. Herein, a node associated with the at least one object from the visualization network is selected. At block, 704, the at least one object selected, is correlated with the data across and within at least one object lifecycle stages by generating a relationship configuration. The relationship configuration is a relationship graph including a relation between the at least one object with one or more object lifecycle stages. Herein, the relation of node with respect to the other node in the one or more object lifecycle. The relationship graph is generated based on the modularity index of the visualization network, adjacency matrix and a CPM value of the selected node. At block 706, a criticality metric for the at least one object is computed. The criticality metric is the measure of the connection of the at least one object with one or more object lifecycle stages derived from the relationship graph. Further, at block 708, at least one multi-level visualization for the at least one object corresponding to one or more object lifecycle stages is generated based on the criticality matric.

The order in which the in which the method(s) are described is not intended to be construed as a limitation, and any number of the described method blocks can be combined in any order to implement the method 700, or an alternative method. Additionally, individual blocks may be deleted from the methods without departing from the spirit and scope of the subject matter described herein. Furthermore, the method 700 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

In various embodiments of FIGS. 1-7, a method and system for mutual coordination of multi visual data representation of object life cycle is disclosed. The system facilitates an environment to aid multi-criteria redesign-related decision making for a value chain. For example, a replacement (modification) in the existing design of a supply chain stage, the anticipated effects of the replacement will be updated by the present system by posing 'what-if' scenarios for a decision maker.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What is claimed is:

1. A computer implemented system for multi-level data visualization of object lifecycle, the system comprising:
 a visualization interface;
 a data repository in communication with the visualization interface:
 at least one memory; and
 at least one processor, the at least one memory and the visualization interface coupled to the at least one processor, wherein the at least one processor is capable of executing programmed instructions stored in the at least one memory to:
 select at least one object from at least one visualization network on at least one device, the at least one visualization network represents a network of one or more object life cycle stages comprising an object configuration network and an object value chain network, wherein the selection of the at least one object results in showing details of the at least one object in both the object configuration network and the object value chain network, wherein the visualization network includes a plurality of objects and is represented by nodes and edges, wherein, in the object configuration network, the node represent the object and the edge represents structural relationship between the plurality of objects, wherein, in the object value chain network, the node represents stages of a value chain of the object and the edge represents a flow of object within the value chain, wherein the connectivity of the nodes in the object configuration network and the object value chain network is represented by a change propagation metric (CPM) that provides a node centrality measurement in the object configuration network and the object value chain network and the CPM is computed from an adjacency matrix that provides a measure of a relationship configuration of the selected at least one object with respect to other objects in the visualization network;

correlate the selected at least one object with objects across and with objects within one or more object lifecycle stages with the relationship configuration;

compute a criticality metric for the selected at least one object, the criticality metric being a measure of a connection of the at least one object with one or more object lifecycle stages derived from the relationship configuration, wherein the criticality metric generates a value based on at least one object attribute for the selected at least one object and displayed as graphical data; and generate at least one multi-level visualization comprising visualization layouts for the at least one object corresponding to one or more object lifecycle stages based on the criticality metric, wherein the at least one multi-level visualization is generated by mapping the graphical data on to visual variables to obtain clusters of graphical data for multi-level representation of the at least one object, wherein each node is associated with the one or more visual variables including a size of the node, a position of the node, and at least one of a color of the node, a value of the node, a shape of the node, an orientation of the node, and a texture of the node, wherein the size of the node represents a criteria of interest, the color of the node indicating the stages of a value chain of the object, and the position of the node represents a parent-child relationship of a plurality of objects in the at least one visualization network, wherein the node centrality measurement provides closeness centralities of edges in the visualization network, wherein the at least one multi-level visualization for the at least one object is modified based on the criteria of interest comprising at least one of a time associated with the at least one object, environmental indicators of the at least one object, and cost of the at least one object, wherein the data repository receives selection of the at least one object, extracts life cycle inventory (LCI) for the selected at least one object from a product database management (PPM), wherein the system facilitates an environment to aid multi-criteria redesign-related decision making for the object value chain including replacement in an existing design of the stages in the value chain and provide anticipated effects of the replacement as scenarios to a decision maker.

2. The system as claimed in claim 1, wherein the data repository comprises data associated with a plurality of objects and object value chain.

3. The system as claimed in claim 1, wherein the at least one processor is capable of executing programmed instructions stored in the at least one memory to measure a relation between the at least one object and the one or more object life cycle stages based on a relationship between the nodes and edges of each of the visualization network.

4. The system as claimed in claim 1, wherein the at least one processor is capable of executing programmed instructions stored in the at least one memory to evaluate the impact of correlation by comparing the at least one object with one or more life cycle stages for each of criterion of interest.

5. The system as claimed in claim 4, wherein the impact of correlation comprises a score associated with the criticality metric of the at least one object.

6. The system as claimed in claim 1, wherein the at least one processor is capable of executing programmed instructions stored in the at least one memory to select at least one object by a plurality of users on a plurality of devices, wherein the plurality of users being associated with a plurality of expertise level.

7. The system as claimed in claim 1, wherein the at least one processor is capable of executing programmed instructions stored in the at least one memory to:
link data sets, the data sets comprising at least two object life cycle stages from the object value chain network and object configuration network; and
provide a mutually coordinated multi-level visualization of the data sets.

8. The system as claimed in claim 7, wherein the at least one processor is capable of executing programmed instructions stored in the at least one memory to determine a deviation from a probable life cycle stage based on mutually coordinated multi-level visualization of the data sets, wherein the deviation is the measure of existing lifecycle stage in each visualization network and the probable life cycle stage.

9. A computer implemented method for multi-level representation of object lifecycle, the method comprising:
selecting at least one object from at least one visualization network on at least one device, the at least one visualization network represents a network of one or more object life cycle stages comprising an object configuration network and an object value chain network, wherein the selection of the at least one object results in showing details of the at least one object in both the object configuration network and the object value chain network, wherein the visualization network includes a plurality of objects and is represented by nodes and edges, wherein, in the object configuration network, the node represent the object and the edge represents structural relationship between the plurality of objects, wherein, in the object value chain network, the node represents stages of a value chain of the object and the edge represents a flow of object within the value chain, wherein the connectivity of the nodes in the object configuration network and the object value chain network is represented by a change propagation metric (CPM) that provides a node centrality measurement in the object configuration network and the object value chain network and the CPM is computed from an adjacency matrix that provides a measure of a relationship configuration of the selected at least one object with respect to other objects in the visualization network:

correlating the selected at least one object with objects across and with objects within one or more object lifecycle stages with the relationship configuration;

computing a criticality metric for the selected at least one object, the criticality metric being a measure of a connection of the at least one object with one or more object lifecycle stages derived from the relationship configuration, wherein the criticality metric generates a value based on at least one object attribute for the selected at least one object and displayed as graphical data; and generating at least one multi-level visualization comprising visualization layouts for the at least one object corresponding to one or more object lifecycle stages based on the criticality metric, wherein the at least one multi-level visualization is generated by mapping the graphical data on to visual variables to obtain clusters of graphical data for multi-level representation of the at least one object, wherein each node is associated with the one or more visual variables including a size of the node, a position of the node, and at least one of a color of the node, a value of the node, a shape of the node, an orientation of the node, and a texture of the node, wherein the size of the node represents a criteria of interest, the color of the node indicating the stages of a value chain of the object, and the position of the node represents a parent-child relationship of a plurality of objects in the at least one visualization network; and facilitating an environment to aid multi-criteria redesign-related decision making for the object value chain including replacement in an existing design of the stages in the value chain and provide anticipated effects of the replacement as scenarios to a decision maker, wherein the node centrality measurement provides closeness centralities of edges in the visualization network, wherein the at least one multi-level visualization for the at least one object is modified based on the criteria of interest comprising at least one of a time associated with the at least one object, environmental indicators of the at least one object, and cost of the at least one object, wherein a data repository receives selection of the at least one object, extracts life cycle inventory (LCI) for the selected at least one object from a product database management (PPM).

10. The method as claimed in claim 9, wherein method further comprises evaluating the impact of correlation by comparing the at least one object with one or more life cycle stages for each of criterion of interest.

11. The method as claimed in claim 9, wherein method further comprises selecting at least one object by a plurality of users on a plurality of devices, wherein the plurality of users being associated with a plurality of expertise level.

12. The method as claimed in claim 9, wherein method further comprises:
linking data sets, the data sets comprising at least two object life cycle stages from the object value chain network and object configuration network; and
providing a mutually coordinated multi-level visualization of the data sets.

13. The method as claimed in claim 12, wherein method further comprises determining a deviation from a probable life cycle stage based on mutually coordinated multi-level visualization of the data sets, wherein the deviation is the measure of existing lifecycle stage in each visualization network and the probable life cycle stage.

14. The method as claimed in claim 9, wherein a change in object selection results in updating at least one of a background color of the object, object label, object layout, detailed viewer, points, and layout.

15. The method as claimed in claim 9, wherein a change in the criteria of interest results in updating at least one of background color of the object, object layout, and object label.

16. A non-transitory computer-readable medium having embodied thereon a computer program for executing a method for multi-level data visualization of object lifecycle, the method comprising:

selecting at least one object from at least one visualization network on at least one device, the at least one visualization network represents a network of one or more object life cycle stages comprising an object configuration network and an object value chain network, wherein the selection of the at least one object results in showing details of the at least one object in both the object configuration network and the object value chain network, wherein the visualization network includes a plurality of objects and is represented by nodes and edges, wherein, in the object configuration network, the node represent the object and the edge represents structural relationship between the plurality of objects, wherein, in the object value chain network, the node represents stages of a value chain of the object and the edge represents a flow of object within the value chain, wherein the connectivity of the nodes in the object configuration network and the object value chain network is represented by a change propagation metric (CPM) that provides a node centrality measurement in the object configuration network and the object value chain network and the CPM is computed from an adjacency matrix that provides a measure of a relationship configuration of the selected at least one object with respect to other objects in the visualization network:

correlating the selected at least one object with objects across and with objects within one or more object lifecycle stages with the relationship configuration, computing a criticality metric for the selected at least one object, the criticality metric being a measure of a connection of the at least one object with one or more object lifecycle stages derived from the relationship configuration, wherein the criticality metric generates a value based on at least one object attribute for the selected at least one object and displayed as graphical data;

generating at least one multi-level visualization comprising visualization layouts for the at least one object corresponding to one or more object lifecycle stages based on the criticality metric, wherein the at least one multi-level visualization is generated by mapping the graphical data on to visual variables to obtain clusters of graphical data for multi-level representation of the at least one object, wherein each node is associated with the visual variables including a size of the node, a position of the node, and at least one of a color of the node, a value of the node, a shape of the node, an orientation of the node, and a texture of the node, wherein the size of the node represents a criteria of interest, the color of the node indicating the stages of a value chain of the object, and the position of the node represents a parent-child relationship of a plurality of objects in the at least one visualization network; and facilitating an environment to aid multi-criteria redesign-related decision making for the object value chain including replacement in an existing design of the stages in the value chain and provide anticipated effects of the replacement as scenarios to a decision maker, wherein the node centrality measurement provides closeness centralities of edges in the visualization network, wherein the at least one multi-level visualization for the at least one object is modified based on the criteria of interest comprising at least one of a time associated with the at least one object, environmental indicators of the at least one object, and cost of the at least one object, wherein a data repository receives selection of the at least one object, extracts life cycle inventory (LCI) for the selected at least one object from a product database management (PPM).

* * * * *

UNITED STATES PATENT AND TRADEMARK OFFICE
CERTIFICATE OF CORRECTION

Page 1 of 1

PATENT NO. : 10,929,785 B2
APPLICATION NO. : 14/818816
DATED : February 23, 2021
INVENTOR(S) : Bernstein et al.

It is certified that error appears in the above-identified patent and that said Letters Patent is hereby corrected as shown below:

In the Claims

In Column 13, Line 54, in Claim 1, delete "(PPM)," and insert --(PDM),-- therefor In Column 15, Line 38, in Claim 9, delete "(PPM)." and insert --(PDM).-- therefor In Column 17, Line 8, in Claim 16, delete "(PPM)." and insert --(PDM).-- therefor Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*